United States Patent
Imran et al.

(10) Patent No.: US 12,447,454 B1
(45) Date of Patent: Oct. 21, 2025

(54) USE OF SULFUR AS ALTERNATIVE CARBON-FREE FUEL IN AMMONIA PRIMARY REFORMER COMBUSTION ZONE, BY COUPLING AMMONIA AND SULFURIC ACID PRODUCTION FACILITIES

(71) Applicant: Saudi Arabian Mining Company (Ma'aden), Riyadh (SA)

(72) Inventors: Kashif Imran, Adelaide (AU); Malik Mohammad Odeh Aqel, Amman (JO)

(73) Assignee: Saudi Arabian Mining Company (MA'ADEN), Riyadh (SA)

( * ) Notice: Subject to any disclaimer, the term of this patent is extended or adjusted under 35 U.S.C. 154(b) by 0 days.

(21) Appl. No.: 18/904,840

(22) Filed: Oct. 2, 2024

(30) Foreign Application Priority Data

Aug. 30, 2024 (EP) .................................. 24197709

(51) Int. Cl.
| | |
|---|---|
| *B01J 8/02* | (2006.01) |
| *C01B 3/34* | (2006.01) |
| *C01B 17/80* | (2006.01) |
| *C01C 1/04* | (2006.01) |
| *F02C 1/05* | (2006.01) |

(52) U.S. Cl.
CPC .......... *B01J 8/0278* (2013.01); *B01J 8/0285* (2013.01); *C01B 3/34* (2013.01); *C01B 17/806* (2013.01); *C01C 1/0417* (2013.01); *C01C 1/0452* (2013.01); *F02C 1/05* (2013.01); *B01J 2208/00309* (2013.01); *B01J 2208/00504* (2013.01); *C01B 2203/0233* (2013.01); *C01B 2203/068* (2013.01); *C01B 2203/0811* (2013.01); *C01B 2203/0833* (2013.01); *C01B 2203/1241* (2013.01); *F05D 2220/64* (2013.01)

(58) Field of Classification Search
CPC ..... B01J 8/00; B01J 8/02; B01J 8/0278; B01J 8/0285; B01J 2208/00; B01J 2208/00008; B01J 2208/00017; B01J 2208/00106; B01J 2208/00309; B01J 2208/00504; C01B 3/00; C01B 3/02; C01B 3/32; C01B 3/34; C01B 17/00; C01B 17/69; C01B 17/74; C01B 17/76; C01B 17/80; C01B 17/806; C01B 2203/00; C01B 2203/02; C01B 2203/0205; C01B 2203/0227; C01B 2203/0233; C01B 2203/06; C01B 2203/068; C01B 2203/08; C01B 2203/0805; C01B 2203/0811; C01B 2203/0833; C01B 2203/12–1241; C01C 1/00; C01C 1/04; C01C 1/0405; C01C 1/0417; C01C 1/447; C01C 1/0452; F02C 1/00; F02C 1/04; F02C 1/05; F05D 2220/00; F05D 2220/60; F05D 2220/64

See application file for complete search history.

(56) References Cited

FOREIGN PATENT DOCUMENTS

WO  WO-2021118599 A1 * 6/2021 ......... B01D 53/1481

* cited by examiner

*Primary Examiner* — Natasha E Young
(74) *Attorney, Agent, or Firm* — MH2 Technology Law Group, LLP

(57) ABSTRACT

A novel integrated system utilizing sulfur as alternative carbon-free fuel in an ammonia primary reformer combustion zone, with co-production of sulfuric acid from concentrated $SO_2$ off-gas stream. Such integration shall reduce hydrocarbon fuel consumption, minimize $CO_2$ emissions, and optimize overall energy utilization.

15 Claims, 1 Drawing Sheet

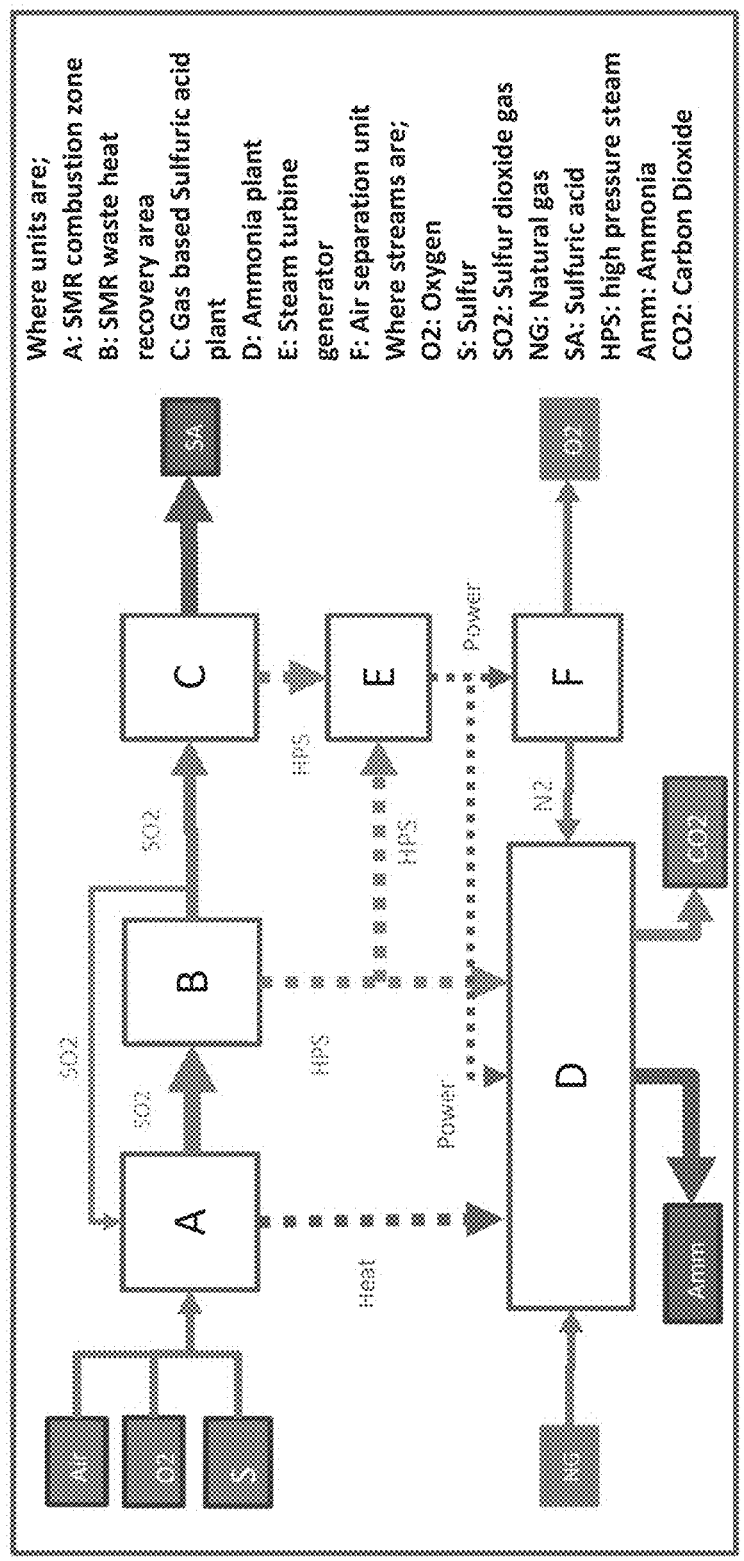

USE OF SULFUR AS ALTERNATIVE CARBON-FREE FUEL IN AMMONIA PRIMARY REFORMER COMBUSTION ZONE, BY COUPLING AMMONIA AND SULFURIC ACID PRODUCTION FACILITIES

TECHNICAL FIELD

The present invention relates to a novel integrated system using sulfur burning as heat source in ammonia reformer combustion zone to produce low carbon ammonia coupled with sulfuric acid production from sulfur dioxide flue gases.

BACKGROUND OF THE INVENTION

Ammonia not only is utilized consider as feedstock for fertilizer industry but is also used as a sustainable energy carrier. Ammonia has an advantage over hydrogen as medium to store and carry energy. More than 90% of world ammonia production is obtained using the Haber-Bosch synthesis process. This system is established by combining hydrogen and nitrogen over a catalyst under high pressure to produce ammonia gas. In a conventional natural gas based ammonia plants an average of 2.4 tons of $CO_2$ is emitted when one ton of ammonia is produced. The level of emission is significantly higher in the case of using other feedstocks like, for example, heavy fuel oil, naphtha, coal, natural gas coke oven, and refinery gas, which can all be used as feedstock for ammonia production. Among other approaches, steam methane reforming is currently the least energy intensive technique. Natural gas production costs are 70-90% of the production cost of ammonia. In steam methane reforming (SMR) ammonia production plant, hydrocarbon sources are the primary feed, where close to 70% hydrocarbon are used as feedstock for catalytic cracking in the reformer operations, in addition to 30% hydrocarbon used as fuel to heat up the catalyst, which are leading to high energy consumption and high greenhouse gases (GHG) emissions. Due to this fact, currently, there is a need and an increased pressure on the ammonia production industry to reduce both its energy consumption and emissions to become a sustainable industry for future energy transition.

SUMMARY OF THE EMBODIMENTS

The present invention discloses an energy integration system between SMR based Ammonia plant and gas based sulfuric acid production plant, by substituting the hydrocarbon fuel used in the heating up of the SMR's primary reformer with sulfur, partially or completely.

Disclosed herein is a novel integrated system to produce ammonia coupled with sulfuric acid production, including: (1) providing oxygen from an air separation unit to the combustion zone of a typical SMR based ammonia plant's primary reformer; (2) providing air; (3) providing molten sulfur; (4) burning molten sulfur as fuel with a mixture of air and $O_2$; (5) producing an $SO_2$-rich stream exiting the ammonia primary reformer combustion zone and waste heat recovery zones; (6) producing high pressure steam for use in typical SMR based ammonia plant, while excess steam can be used to generate power; (7) transferring the rich sulfur dioxide stream without treatment to a gas based sulfuric acid plant; (8) converting sulfur dioxide to sulfuric acid in a conventional sulfuric acid plant and using heat produced in the waste heat recovery zone for generating electric power; (9) utilizing the power generated in sulfuric acid plant and ammonia plant to run the conventional air separation unit or equivalent; (10) utilizing the oxygen generated for sulfur burning, and the nitrogen generated for a typical ammonia synthesis stage; (11) controlling the combustion temperature of sulfur with air/oxygen by recycling cooled flue gases stream from the reformer's waste heat system; and optionally (12) mixing natural gas or other hydrocarbon stream with the molten sulfur burning in the primary reformer combustion zone, wherein (a) sulfur is burned through dual fuel burners, where at least about 50% of the fuel is molten sulfur and the remainder can be natural gas in the combustion zone of the primary ammonia reformer; (b) the mixture of air and oxygen is approximately in an air to oxygen ratio of about 1:4 to about 2:3 by wt.; (c) concentrated stream sulfur dioxide is produced ranging from about 10 to about 40% v/v; (d) the sulfur dioxide stream exiting the waste heat recovery area is at a temperature below or equal to about 400° C.; and (e) the ammonia produced comprises reduced carbon emissions from about 15% to about 30% compared to today's existing SMR plants based on natural gas.

The present invention discloses an energy integration system between SMR based Ammonia plant and gas based sulfuric acid production plant, by substituting the hydrocarbon fuel used in the heating up of the SMR's primary reformer with sulfur, partially or completely.

In further embodiments, a mixture of air and $O_2$ is provided to an ammonia primary reformer combustion zone with an air to oxygen ratio of 1:4 to 2:3, and a concentrated stream of SO2 is produced in an amount ranging from 15 to 40% v/v.

In some embodiments, a high temperature of up to 2500° C. is generated by combusting sulfur and oxygen rich stream in the primary ammonia reformer's combustion zone, and is subsequently lowered to a range of about 1300 to 1600° C. by recycling the cooled sulfur dioxide stream after the waste heat recovery area.

In further embodiments, the sulfur dioxide-rich stream is added from a recycled stream and transferred to a waste heat recovery at a final temperature of about 350 to 450° C., the waste heat produced is carbon-free used as a source of power in the steam turbine generator to power the ammonia plant, and the excess power produced is exported.

In some embodiments, the sulfuric acid units utilized are sulfur dioxide flue gas-based units.

BRIEF DESCRIPTION OF THE FIGURES

The accompanying drawing is not intended to be drawn to scale. In the drawing, each identical or nearly identical component that is illustrated in various figures is represented by a like numeral. For purposes of clarity, not every component may be labeled in the drawing.

FIG. 1. illustrates a block diagram with units number and streams symbols used in the description of the novel system. (a) Units description: A: SMR combustion zone; B: SMR waste heat recovery area; C: Gas based Sulfuric acid plant; D: Ammonia plant; E: Steam turbine generator; F: Air separation unit. (b) Streams description: O2: Oxygen; S: Sulfur; SO2: Sulfur dioxide gas; NG: Natural gas; SA: Sulfuric acid; HPS: high pressure steam; Amm: Ammonia; CO2: Carbon Dioxide; Heat: radiation and convection heat from fuel burning in the SMR combustion zone; Power: electric power from steam generator turbine.

DETAILED DESCRIPTION OF SPECIFIC EMBODIMENTS

Definitions

As used in this description and the accompanying claims, the following terms shall have the meanings indicated, unless the context otherwise requires.

As used herein, the singular forms "a, an" and "the" include plural references unless the content clearly dictates otherwise.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

DESCRIPTION OF SPECIFIC EMBODIMENTS

Sulfuric acid technology is well established based on sulfur burning with air. Recently the technology started to move towards more oxygen based sulfur burning allowing better energy recovery and smaller plant sizing.

The current invention relates to a novel integrated system to produce ammonia using sulfur as a carbon free alternative fuel in an ammonia primary reformer combustion zone. The system integrates and couples ammonia and sulfuric acid production to optimize energy utilization and minimize $CO_2$ emissions.

The novelty of the integrated system stems from utilizing proven technology in combustion engineering to burn sulfur with a mixture of air and $O_2$ in a prescribed ratio as a replacement of natural gas as fuel burned with air in an ammonia reformer combustion zone.

FIG. 1 describes the use of sulfur as an alternative carbon free fuel in an ammonia primary reformer combustion zone, coupling ammonia and sulfuric acid production and optimizing all energy utilization and reducing carbon dioxide emissions below 1.8 t CO2/t Ammonia.

In embodiments, the mixture of air and $O_2$ as a feed to the S burner in the SMR combustion zone, referred to as block A, where the combustion mixture temperature is cooled by mixing it with recycled SO2 stream after it has been cooled down in the SMR waste heat recovery area, referred to as block B, where HPS is sent to the steam turbine generator, referred to as block E.

In embodiments, the remaining $SO_2$ goes directly to the gas based sulfuric acid plant, referred to as block C, to produce sulfuric acid SA and HPS that is sent to block E.

In embodiments, the electric power generated in block E is utilized to produce both oxygen needed in step 1 and nitrogen, which can be used in ammonia synthesis loop in the ammonia plant, referred to as block D.

In embodiments, the conventional ammonia plant in block D utilizes the radiation and convection heat generated in block A to heat the catalyst in the primary reformer. The HPS generated in block B can partially be used to drive different steam turbine driven motors in block D, as well as be used to generate electric power in block E, where power can in turn be used in part to drive electric motors in block D.

In embodiments, both block A and block B are integrated in block D in conventional SMR based ammonia plants.

In preferred embodiments, unlike conventional ammonia plants (blocks A, B, and D), where NG or hydrocarbon fuels are used, flue gases containing $CO_2$ are sent to stack, in our novel approach, flue gases containing $SO_2$ are sent to sulfuric acid in block C.

In most preferred embodiments, by using sulfur as an alternative fuel to NG or other hydrocarbon fuels, the net $CO_2$ emission from block D results being only the pure $CO_2$ processed from conventional carbon dioxide removal stage.

In some embodiments, the integrated system can produce up to 30% concentrated stream of $SO_2$ at a temperature of at least about 400° C. that is transferred to a sulfuric acid plant to convert it to sulfuric acid, where the excess heat generated during this process is captured through conventional waste heat recovery systems to produce high pressure steam and generate enough clean energy to run the air separation unit and supply conventional ammonia plants with its requirement of high pressure steam and power.

In some embodiments, the air separation unit provides the necessary oxygen to burn the sulfur as fuel in ammonia reformer combustion zone and nitrogen can be used in the Ammonia ($NH_3$) synthesis process.

In preferred embodiments, the integrated process lowers the natural gas consumption in ammonia production in the range of about 25% to about 30% in standard steam methane reforming (SMR) technology-based ammonia plants.

In preferred embodiments, in the primary reformer there are two streams of natural gas supplies. One stream is solely used to burn through the burners and generates heat through combustion process. The other stream is used as a process feedstock gas to produce a mixture of $CO_2$, hydrogen and unconverted natural gas (methane).

In some embodiments, sulfur as fuel burns through dual fuel burners in the ammonia reformer combustion zone instead of natural gas (FIG. 1) in addition to a mixture of specific ratio of air and oxygen to produce a concentrated $SO_2$-rich off-gas stream.

In some embodiments, dilution with concentration $SO_2$ recycle stream is required to lower the high temperature produced from combusting sulfur and $O_2$ at up to about 2500° C. to a range of about 1300 to about 1600° C., as required by the conventional ammonia primary reformer catalyst.

In preferred embodiments, the $SO_2$-rich stream from the reformer's combustion zone moves through the waste heat recovery, where the final temperature is maintained at approximately 350-450° C., and the waste heat recovered is considered carbon free energy that is utilized to produce high pressure steam, which is used in the conventional ammonia plant operations.

In preferred embodiments, the excess heat is utilized to produce power in steam turbine generator, which in turn is used to power the ammonia plant, while the excess power is stored and/or can be exported.

In some embodiments, the rich $SO_2$ gas stream is transferred to a conventional $SO_2$ based sulfuric acid plant to produce virgin sulfuric acid, and to the heat recovery system to produce steam that is utilized to produce power via steam turbine generators.

In further embodiments, the clean power from ammonia plant and sulfuric acid plants is used to power up the air separation unit to produce pure oxygen ($O_2$) and Nitrogen (N) that is used in sulfur burning and ammonia production respectively.

In some embodiments, the use of sulfur as a fuel in ammonia reformer avoids the sole use of hydrocarbon fuels (methane) to minimize $CO_2$ emissions during ammonia production.

In some embodiments, the system of the subject invention reduces the carbon emission from ammonia production operations to produce low carbon ammonia integrated with sulfuric acid production resulting in reducing the carbon footprint and producing more sustainable ammonia as a commercial product.

In some embodiments, the subject invention avoids the production of combustion flue gases with diluted $CO_2$ concentration, which represents a novel alternative to known art of hydrocarbon fuel combustion's flue gases $CO_2$ capturing technologies today.

While the disclosure is susceptible to various modifications and alternative forms, specific aspects thereof are shown by way of example in the drawing and will herein be described in detail. It should be understood, however, that the drawings and detailed description presented herein are not intended to limit the disclosure to the particular aspects disclosed, but on the contrary, the intention is to cover all modifications, equivalents, and alternatives falling within the spirit and scope of the present disclosure as defined by the appended claims.

Other features and advantages of this invention will become apparent in the following detailed description of preferred aspects of this invention, taken with reference to the accompanying drawing.

The disclosure will be more fully understood upon consideration of the following non-limiting Examples. It should be understood that these Examples, while indicating preferred embodiments of the subject technology, are given by way of illustration only. From the above discussion and these Examples, one skilled in the art can ascertain the essential characteristics of the subject technology, and without departing from the spirit and scope thereof, can make various changes and modifications of the subject technology to adapt it to various uses and conditions.

EXPERIMENTAL EXAMPLES

The focus of our research was on the SMR process for producing ammonia by replacing natural gas fuel in the reformer combustion zone with sulfur as carbon-free fuel, with co-production of sulfuric acid. The remaining natural gas feedstock and high pressure steam was converted in the reformer tubes to hydrogen (H2) and carbon mono-oxide (CO), with the help of external heating from the combustion zone. Generally, process $CO_2$ emissions can be easily sequestered in a Carbon Capturing, Utilization and Storage (CCUS), but other flue gases from combustion prove to be more challenging. A comparison of the standard SMR unit using natural gas as fuel and the present invention's use of sulfur as fuel is shown in Table 1.

TABLE 1 comparison of the standard SMR unit using natural gas as fuel and the present invention's use of sulfur as fuel

| Process | Steam Methan Reformer (conventional with NG fuel)* | Steam Methan Reformer current invention (with Sulfur as fuel) |
|---|---|---|
| Ammonia capacity (t/d) | 3,300 | 3,300 |
| Natural Gas (t/d as feed) | 1,548 | 1,548 |
| Process $CO_2$ (t/d) (can be easily sequestered in CCUS) | 4,046 | 4,046 |
| Natural Gas (t/d as fuel) | 594 | 0 |
| Flue gases $CO_2$ (t/d) | 1,535 | 0 |
| Sulfur (t/d as fuel) | 0 | 3,300 |
| Imported Electricity (GWh) | 131.4 | 131.4 |
| $CO_2$eq from Electric power import (t/d) | 641 | 0 |
| Total $CO_2$eq/tAmmonia | 1.89 | 1.23 |
| Total $CO_2$eq/tAmmonia (with process $CO_2$ CCUS) | 0.66 | 0.00 |

*Existing art

Other existing processes for ammonia production are well established and include: autothermal reforming (ATR) with direct use of most of the natural gas within the reformer with partial oxidation using enriched oxygen air to allow proper control on syngas composition through the process. Similar comparison between ATR and current invention shown in Table (2).

TABLE 2 comparison between Auto Thermal Reformer (ATR) unit using natural gas as fuel and the present invention's use of sulfur as fuel

| Process | Auto Thermal Reformer (conventional with NG fuel)* | Steam Methan Reformer (current invention with Sulfur as fuel) |
|---|---|---|
| Ammonia capacity (t/d) | 3,300 | 3,300 |
| Natural Gas (t/d as feed) | 1,944 | 1,548 |
| Process $CO_2$ (t/d) | 4,838 | 4,046 |
| Natural Gas (t/d as fuel) | 185 | 0 |
| Flue gases $CO_2$ (t/d) | 502 | 0 |
| Sulfur (t/d as fuel) | 0 | 3,300 |
| Imported Electricity (GWh) | 145 | 131.4 |
| $CO_2$eq from Electric power import (t/d) | 706 | 0 |
| Total $CO_2$eq/t Ammonia | 1.83 | 1.23 |
| Total $CO_2$eq/t Ammonia (with process $CO_2$ CCUS) | 0.37 | 0.00 |

*Existing art

A comparison of Table 1 and 2 demonstrates the superiority of the subject invention with respect to prior systems and its potential for being the best-in-class for the production of low carbon ammonia. With refence to patent #WO2021/118599A1, the use of high $O_2$/air ratio allows high concentration $SO_2$ gas stream, which can be used in gas-based sulfuric acid plant as per existing art with inherited high heat recovery during the process of $SO_2$ conversion to $SO_3$, high absorption rate in the sulfuric acid absorption towers, and minimum heat loss with off gases due to limited $N_2$ in feed gas. The carbon-free power generated from sulfuric acid plant can also be utilized in the air separation unit for increasing O2 concentration in the sulfur combustion zone, in the SMR reformer.

EXEMPLARY EMBODIMENTS

1. The embodiment for an integrated system to produce ammonia coupled with sulfuric acid production, the system comprising:
  (a) providing $O_2$ from an air separation unit to an ammonia primary reformer;
  (b) providing air;
  (c) providing molten sulfur;
  (d) burning sulfur as fuel burn with a mixture of air and $O_2$;
  (e) producing an $SO_2$-rich stream exiting the ammonia primary reformer combustion zone and a waste heat recovery zone;
  (f) maintaining control of the combustion temperature of the sulfur with air and $O_2$ by recycling cooled $SO_2$-rich stream from the waste heat recovery zone;
  (g) utilizing the high pressure steam generated in the waste heat recovery zone to operate steam driven turbine machines;
  (h) utilizing medium pressure steam excess from the waste heat recovery zone to run a full condensation steam turbine generator;
  (i) utilizing the power generated from excess medium pressure steam to operate electrically driven motors in the ammonia plant;
  (j) transferring the $SO_2$-rich stream to at least one sulfuric acid plant;
  (k) converting $SO_2$ to sulfuric acid in the sulfuric acid plant;
  (l) generating heat in the sulfuric acid plant;
  (m) producing high pressure steam utilizing the heat generated in the sulfuric acid plant;
  (n) utilizing the energy produced by the high pressure steam to run the steam turbine generator;
  (o) utilizing the power generated by the steam turbine in the air separation unit;
  (p) utilizing nitrogen in ammonia syntheses loop in the ammonia plant; and
  (q) producing low carbon ammonia; and
  (r) utilizing the carbon-free power generated in the air separation unit.

2. The integrated system of embodiment 1, wherein the primary reformer combustion zone comprises two streams of fuel selected from the group consisting of stream for natural gas and stream for sulfur.

3. The integrated system of any of the preceding embodiments, wherein a Steam Methane Reformer (SMR) catalyst heating system is used to burn sulfur in the ammonia primary reformer combustion zone.

4. The integrated system of any of the preceding embodiments, wherein heat produced from sulfur burning in the SMR catalyst heating system is directly applied to heat the catalyst columns in the primary reformer that pre-heat feed-stock NG and generate high pressure steam.

5. The integrated system of any of the preceding embodiments, wherein any sulfuric units utilized is a $SO_2$ gas-based units.

6. The integrated system of any of the preceding embodiments, wherein the mixture of air to oxygen provided to the combustion zone has a ratio of about 1:4 to about 2:3 by wt.

7. The integrated system of any of the preceding embodiments, wherein the SO2-rich stream is produced at a concentration ranging from about 15 to about 40% v/v.

8. The integrated system of any of the preceding embodiments, wherein heat is generated in the burner exclusively utilizing one or more of the two streams of fuel.

9. The integrated system of any of the preceding embodiments, wherein the combustion of sulfur and $O_2$ in the primary ammonia reformer combustion zone generates a temperature of up to about 2500° C.

10. The integrated system of any of the preceding embodiments, wherein the temperature produced by combusting sulfur and $O_2$ in the primary ammonia reformer combustion zone is lowered to a range of about 1300 to about 1600° C. by the addition of $SO_2$.

11. The integrated system of any of the preceding embodiments, wherein the added $SO_2$ used to reduce the high temperature is added from a recycled stream from the waste heat recovery zone.

12. The integrated system of any of the preceding embodiments, wherein the $SO_2$-rich stream is transferred from a waste heat recovery zone to a final temperature of about 350 to about 450° C.

13. The integrated system of any of the preceding embodiments, wherein the waste heat produced is carbon-free.

14. The integrated system of any of the preceding embodiments, wherein the heat produced in the waste heat recovery zone is used as a source of power in the steam turbine generator to power the ammonia plant.

15. The integrated system of any of the preceding embodiments, wherein excess power produced is stored.

What is claimed is:

1. A process comprising an integrated system to produce ammonia coupled with sulfuric acid production, the process comprising: (a) providing $O_2$ from an air separation unit to an ammonia primary reformer comprising a combustion zone; (b) providing air; (c) providing molten sulfur; (d) burning sulfur as fuel burn with a mixture of air and $O_2$; (e) producing an $SO_2$-rich stream exiting the ammonia primary reformer combustion zone and a waste heat recovery zone; (f) maintaining control of the combustion temperature of the sulfur with air and $O_2$ by recycling cooled $SO_2$-rich stream from the waste heat recovery zone; (g) utilizing the high pressure steam generated in the waste heat recovery zone to operate steam driven turbine machines; (h) utilizing medium pressure steam excess from the waste heat recovery zone to run a full condensation steam turbine generator; (i) utilizing the power generated from excess medium pressure steam to operate electrically driven motors in the ammonia plant; (j) transferring the $SO_2$-rich stream to at least one sulfuric acid plant; (k) converting $SO_2$ to sulfuric acid in the at least one sulfuric acid plant; (l) generating heat in the at least one sulfuric acid plant; (m) producing high pressure steam utilizing the heat generated in the at least one sulfuric acid plant; (n) utilizing the energy produced by the high pressure steam to run the steam turbine generator; (o) utilizing the power generated by the steam turbine in the air separation unit; (p) utilizing nitrogen in ammonia syntheses loop in the ammonia plant; and (q) producing low carbon ammonia; and (r) utilizing carbon-free power generated in the air separation unit.

2. The process of claim 1, wherein the primary reformer combustion zone comprises two streams of fuel selected from the group consisting of stream for natural gas and stream for sulfur.

3. The process of claim 1, wherein a Steam Methane Reformer (SMR) catalyst heating system is used to burn sulfur in the ammonia primary reformer combustion zone.

4. The process of claim 3, wherein heat produced from sulfur burning in the SMR catalyst heating system is directly applied to heat primary reformer catalyst columns that pre-heat feed-stock natural gas and generate high pressure steam.

5. The process of claim 1, wherein any sulfuric units utilized is a $SO_2$ gas-based units.

6. The process of claim 1, wherein the mixture of air to oxygen provided to the combustion zone has a ratio of about 1:4 to about 2:3 by wt.

7. The process of claim 1, wherein the $SO_2$-rich stream is produced at a concentration ranging from about 15 to about 40% v/v.

8. The process of claim 2, wherein heat is generated in a burner in the primary reformer combustion zone exclusively utilizing one or more of the two streams of fuel.

9. The process of claim 1, wherein the combustion of sulfur and $O_2$ in the primary ammonia reformer combustion zone generates a temperature of up to about 2500° C.

10. The process of claim 1, wherein the temperature produced by combusting sulfur and $O_2$ in the primary ammonia reformer combustion zone is lowered to a range of about 1300 to about 1600° C. by the addition of $SO_2$.

11. The process of claim 1, wherein the added $SO_2$ used to reduce the high temperature is added from a recycled stream from the waste heat recovery zone.

12. The process of claim 1, wherein the $SO_2$-rich stream is transferred from a waste heat recovery zone to a final temperature of about 350 to about 450° C.

13. The process of claim 1, wherein the waste heat produced is carbon-free.

14. The process of claim 1, wherein the heat produced in the waste heat recovery zone is used as a source of power in the steam turbine generator to power the ammonia plant.

15. The process of claim 1, wherein excess power produced is stored.

\* \* \* \* \*